United States Patent [19]
Pratt et al.

[11] Patent Number: 6,163,988
[45] Date of Patent: Dec. 26, 2000

[54] ASSEMBLY CONNECTABLE TO AN OPERATING ARM OF A MACHINE FOR PERFORMING WORK FUNCTIONS

[75] Inventors: Samuel S. Pratt, Bedford; Dan Shaffer, Duncansville; Tim A. Davis, Berlin; Ashley Hejple, Alum Bank, all of Pa.; Peter Lalos, Gaithersburg, Md.

[73] Assignee: Rockland, Inc., Bedford, Pa.

[21] Appl. No.: 08/443,152

[22] Filed: May 17, 1995

[51] Int. Cl.⁷ .................................................... E02F 3/32
[52] U.S. Cl. ............................ 37/468; 414/723; 403/14; 403/254; 403/257
[58] Field of Search .......................... 37/468, 283, 403; 414/723, 724; 403/254, 256–7, 251, 241, 322, 13–14; 172/272–274, 684.5, 445.2, 748

[56] References Cited

U.S. PATENT DOCUMENTS

| | | | |
|---|---|---|---|
| 832,267 | 10/1906 | Messer et al. | 403/241 |
| 2,346,757 | 4/1944 | Horner | 172/445.2 |
| 2,463,169 | 3/1949 | Grewe | 172/684.5 |
| 3,736,987 | 6/1973 | Easterling | 172/4.5 |
| 3,941,262 | 3/1976 | Moser et al. | 37/444 X |
| 4,369,590 | 1/1993 | Miller | 37/283 X |
| 4,542,929 | 9/1985 | Possinger | 37/186 X |
| 5,054,990 | 10/1991 | Schaeff | 414/722 X |
| 5,140,760 | 8/1992 | Mannbro | 37/444 |
| 5,197,212 | 3/1993 | Vail | 37/379 X |
| 5,411,102 | 5/1995 | Nickels et al. | 172/796 X |
| 5,467,542 | 11/1995 | Hulden | 37/468 |

FOREIGN PATENT DOCUMENTS

| 0001414 | 2/1991 | WIPO | 414/723 |
|---|---|---|---|

*Primary Examiner*—Christopher J. Novosad
*Attorney, Agent, or Firm*—Lalos & Keegan; Michael N. Lau

[57] ABSTRACT

An assembly connectable to an operating arm of a machine for performing work functions comprising of an implement having a wall provided with an opening therein and a coupler including apparatus for detachably securing the coupler to the operating arm, apparatus insertable into the implement wall opening to an operative position having a selected angular relationship with the implement relative to a given axis and apparatus for securing the insertable apparatus in the operative position.

24 Claims, 3 Drawing Sheets

ASSEMBLY CONNECTABLE TO AN OPERATING ARM OF A MACHINE FOR PERFORMING WORK FUNCTIONS

This invention relates to an assembly connectable to an operating arm of an excavator machine or the like for performing a work function such as excavating, grading, raking, grappling, breaking, splitting and the like. This invention further contemplates such type of assembly in which the angular relationship of the position of the implement relative to the free end of the operating arm to which the implement may be connected can be varied to accommodate and facilitate a particular work function to be performed.

Conventional machines used extensively for performing work functions such as excavating soil or minerals, grading terrain, digging pits or trenches, grappling tree trunks or limbs, breaking concrete, raking debris and the like typically are provided with a boom mounted on the frame of the machine which is angularly displaceable relative to the machine frame by means of a hydraulic cylinder assembly interconnecting the boom and the machine frame, an operating arm pivotally mounted on the free end of the boom and angularly displaceable relative to the boom by means of a hydraulic cylinder assembly interconnecting the operating arm and the boom, and a working implement pivotally connected to the free end of the operating arm and angularly displaceable relative to the arm by means of a hydraulic cylinder assembly operatively interconnecting the operating arm and the implement. Typically, such implements are provided with a set of transversely spaced brackets mounted on an upper wall portion thereof, provided with a pair of spaced openings in which there is provided a pair of connecting pins. One of such pins functions to pivotally connect the implement to the free end of the operating arm and the other pin functions to pivotally connect the implement to a linkage provided on the operating arm maneuvered by a cylinder assembly to pivot the implement about the pivotal connection of the implement to the operating arm.

Although implements thus connected to such conventional machine constructions are capable of pivoting about the axis of the pin connecting the implement to the operating arm, the implement is not capable of being angularly displaced relative to the free end of the operating arm about another axis. Such inability restricts the ability of the machine to provide a greater range of maneuvers in performing a variety of work functions without repositioning the machine, redeploying the boom and/or operating arm of the machine or requiring the replacement of the implement. It thus has been found to be desirable to provide an assembly connectable to the operating arm of a machine in the conventional manner which provides an implement which may be reoriented to increase the operational capabilities of the machine without having to reposition the entire machine, redeploy the components of the machine or replace the implement.

Accordingly, it is the principal object of the present invention to provide a novel assembly connectable to an operating arm of a machine providing an implement for performing a work function.

Another object of the present invention is to provide a novel assembly connectable to an operating arm of a machine providing an implement for performing a work function such as excavating, grading, grappling, raking, breaking, splitting and the like.

A further object of the present invention is to provide a novel assembly connectable to an operating arm of a machine providing an implement which may be reoriented relative to the operating arm to which it is connected.

Another object of the present invention is to provide an improved assembly connectable to an operating arm of a machine provided with an implement, the position of which may be angularly displaced relative to the operating arm to which it is connected about a given axis.

A further object of the present invention is to provide a novel assembly connectable to an operating arm of a machine providing an implement which may be reoriented relative to such operating arm to increase its versatility in performing various work functions which is comparatively simple in design, provides a minimum number of components, is relatively inexpensive to manufacture, is conducive to servicing and maintenance, is easy to operate and is highly effective in performance.

Other objects and advantages of the present invention will become more apparent to those persons having ordinary skill in the art to which the present invention pertains from the following description taken in conjunction with the accompanying drawings wherein.

Figure 1:
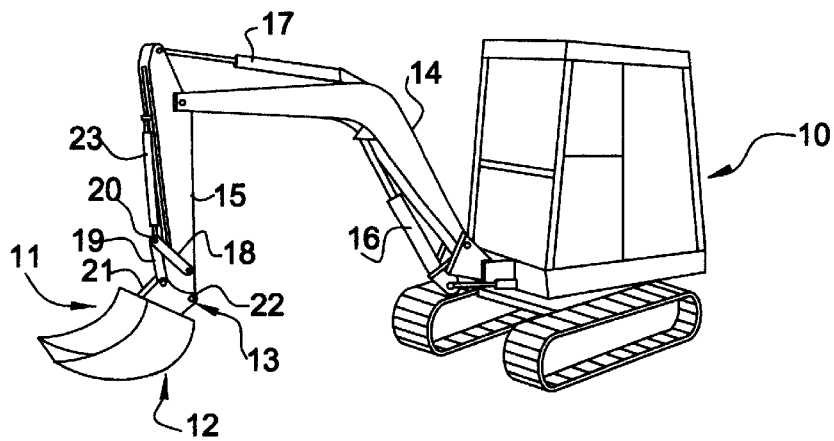
FIG. 1 is a perspective view of an excavator machine provided with an assembly provided with a work implement connected to the operating arm of the machine, embodying the present invention.

Referring to FIG. 1 of the drawings, there is shown a machine 10 provided with an assembly 11 embodying the present invention which includes bucket 12 and a coupler 13. The machine is of a conventional construction and includes a boom 14 pivotally connected to the main frame of the machine, an operating arm 15 pivotally connected to the free end of the boom, a hydraulically actuated cylinder assembly 16 operatively interconnecting the front portion of the main frame of the machine and an intermediate portion of the boom for pivoting the boom and a hydraulically actuated cylinder assembly 17 operatively interconnecting a mid-portion of the boom and an upper end of the operating arm for pivoting the operating arm relative to the boom. The free end of the operating arm is provided with a pair of links 18,18 pivotally connected to the operating arm and a link 19 pivotally connected at one end to the free ends of links 18,18 by means of a pin 20 and pivotally connected at the opposite end to coupler 13 by means of a pin 21. Coupler 13 further is pivotally connected to the free end of operating arm 15 by means of a connecting pin 22 and is caused to be pivoted about the axis of pin 22, relative to the operating arm, along with bucket 12, by means of a hydraulic cylinder assembly 23 operatively interconnecting an upper end of the operating arm and connecting pin 20. It will be appreciated that by operating cylinder assemblies 16, 17 and 23 by means of controls provided at the operator's station in the cab of the machine, bucket 12 or any other working implement may be manipulated to perform various work functions including excavating, grading, clearing, raking, crushing, splitting, breaking and the like, in the conventional manner.

Figure 2:
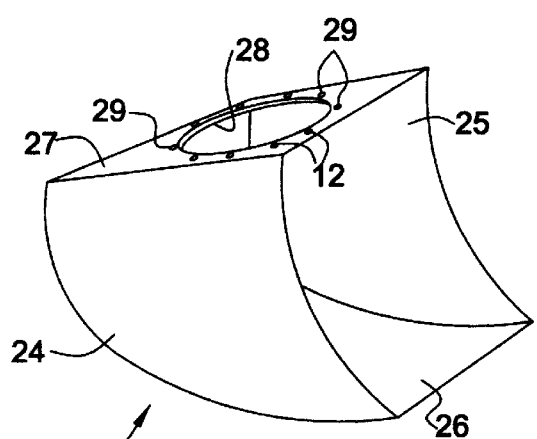
FIG. 2 is an enlarged perspective view of the implement forming a component of the assembly shown in FIG. 1.
Figure 3:
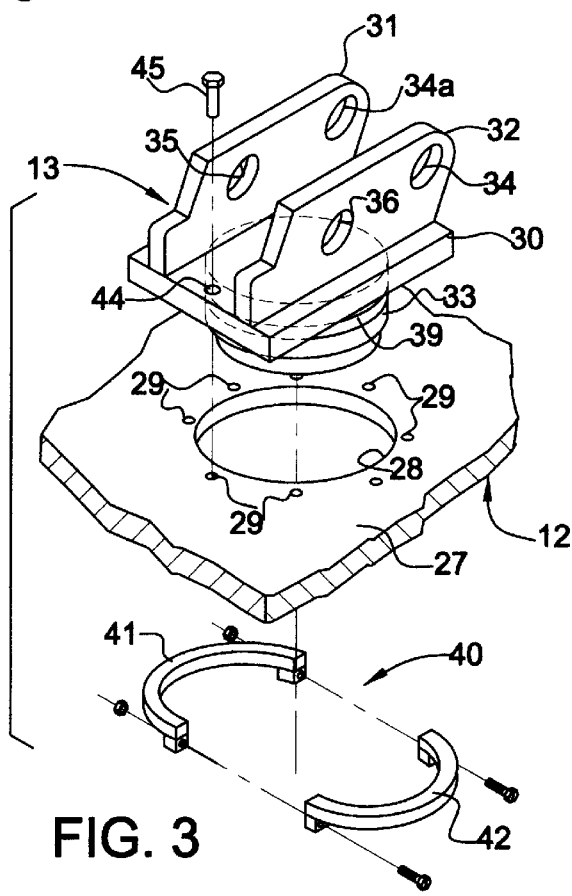
FIG. 3 is a perspective view of the assembly shown in FIG. 1 illustrating the components thereof in exploded relation and having a portion of the implement forming a component of the assembly broken away.

Bucket 12 generally is of a conventional construction and includes a pair of side walls 24 and 25, a rear and lower curved wall 26 and an upper wall 27, providing a forwardly opening material receiving opening having lower and side cutting edges. As best shown in FIGS. 2 and 3, upper wall member 27 is provided with a circular opening 28 and a plurality of pin receiving openings 29 circumferentially spaced about the periphery of opening 28.

Figure 4:
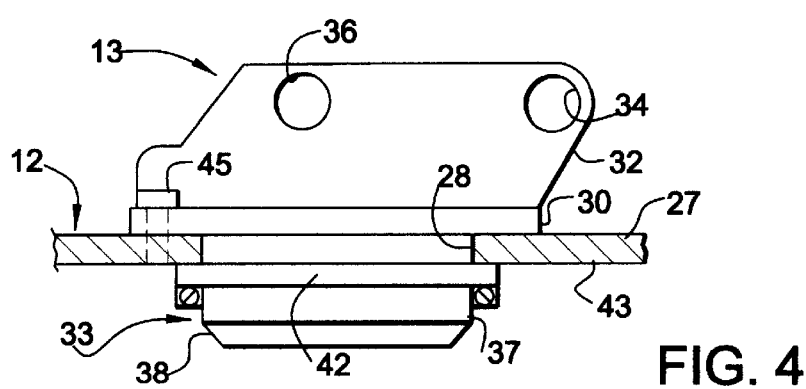
FIG. 4 is an enlarged, vertical sectional view of the assembly shown in FIGS. 1 through 3, having a portion of the implement forming a component of the assembly, broken away.

Coupler 13 is best shown in FIGS. 3 and 4 and includes a base plate section 30, a pair of longitudinally disposed, transversely spaced bracket sections 31 and 32 formed on the upper side of the base plate section and a depending section 33 formed on the underside of the base plate section. Brackets 31 and 32 are provided with a pair of rearwardly disposed, transversely aligned openings 34a and 34 adapted to receive connecting pin 22 for pivotally connecting the coupler and entire assembly 11 to operating arm 15, and a pair of forwardly disposed, transversely aligned openings 35 and 36 adapted to receive connecting pin 21 for pivotally connecting the forward end of coupler 13 to link 19 for pivotal movement of the coupler and entire assembly 11 about the axis of connecting pin 22 upon operation of cylinder assembly 23. Depending section 33 is provided with a cylindrical side wall 37 having a diameter slightly less than the diameter of implement upper wall opening 28 so that such section may be inserted into opening 28 to an operative position as shown in FIG. 4. The lower end of the section is provided with an annular bevel such as at 38 to facilitate the alignment and insertion of depending section 33 when the coupler member is mounted on the implement in the operative position as shown in FIG. 4. Section 33 further is provided with an annular recess 39, as best shown in FIG. 3, which is adapted to receive a split locking ring assembly 40 which functions to prevent the separation of the coupler and implement when in the operative position as shown in FIG. 4. The assembly consists of a pair of semicircular sections 41 and 42 adapted to be received within annular recess 39 in mated relationship and secured together by a set of bolts and nuts extending through aligned openings in depending lugs provided on the ends of the sections. The annular recess in section 33 is adapted to be spaced from the bottom surface of base plate section 30 and the width of the recess and segments 41 and 42 are selected so that when the coupler and implement are arranged in the operative position as shown in FIG. 4, the upper surfaces of segments 41 and 42 will engage or be slightly spaced from underside 43 of implement wall 38 to restrict the linear displacement of the coupler and implement relative to each other in a direction along the axis of opening 28 and inserted section 33. In a modification of the arrangement shown in FIGS. 3 and 4, annular recess 39 may be omitted so that split ring segments 41 and 42 are secured to inserted section 33 by means of the gripping action provided by the tightening of the nut and bolt assemblies.

In the use of the assembly as described, with the bucket positioned on the ground as shown in FIG. 2, the machine being located adjacent the bucket and coupler 13 mounted on the operating arm by means of connecting pins 21 and 22, cylinder assemblies 16, 17 and 23 may be operated by the machine operator to align and insert coupler section 33 into wall opening 28 so that the coupler is seated on the implement wall 27 in the operative position as shown in FIG. 4. With coupler section so inserted in opening 28, the machine cylinders may be manipulated to orient the implement at the desired angle relative to the coupler about the axis of coupler section 33. In doing so, the coupler member is moved relative to the implement so that opening 44 located on the longitudinal center line of the coupler member and registrable with a selected one of circumferentially spaced locking pin openings 29, becomes registered with one of such openings. When locking pin opening 44 becomes registered with a selected one of locking pin openings 29, the angular relationship of the coupler member relative to the implement may be set by inserting a locking pin 45 through the registered openings. With the angular relationship between the coupler member and the implement thus set, the split ring segments may be applied to the inserted coupler section 33 to prevent the separation of the coupler from the implement. Alternatively in the assembly of the components, where sufficient play is provided by the installed split ring segments, the depending coupler section may be inserted in the implement wall opening to the position as shown in FIG. 4, the split ring segments may be mounted on the inserted coupler section, the cylinder assemblies of the machine may be operated to angularly displace the implement relative to the coupler about the axis of the inserted coupler section and then locking pin 45 may be inserted into registered locking pin openings to fix the angular relationship of the implement relative to the coupler. In this alternate method of assembly, angular adjustment of the implement relative to the coupler is permitted by the suitable spacing of the split ring segments from the underside of the implement upper wall to permit rotational movement of the coupler inserted section relative to the implement.

With the assembly components in the operative condition as shown in FIG. 4, it will be appreciated that locking pin 45 functions to restrict the angular displacement of the coupler member and implement relative to each other about the axis of coupler section 33, and split ring locking assembly 40 functions to restrict linear displacement of the coupler member and implement relative to each other along a line of travel coinciding with or parallel to the axis of coupler section 33. Whenever it may be desired to angularly adjust the position of the implement relative to the coupler member, the locking pin and split ring locking assembly may be removed to free up the implement and allow such adjustment or, alternatively, possibly only the locking pin need be removed to allow the angular adjustment.

In addition to the use of such assembly with a bucket as shown in FIGS. 1 through 4, the assembly may be used with other forms of implements, each provided with a wall portion comparable to wall portion 27 of implement 12, an opening in such wall portion comparable to opening 28 of bucket 12 and a plurality of pin receiving openings disposed about the periphery of the wall opening comparable to pin openings 29 in FIG. 3 adapted to be registered with locking pin opening 44 for receiving locking pin 45. As a further modification to the embodiment as shown in FIGS. 1 through 4, openings 29 disposed about the periphery of wall opening 28 may be threaded and adapted to receive a threaded fastener in lieu of merely a locking pin as shown in FIG. 3.

Figure 5:
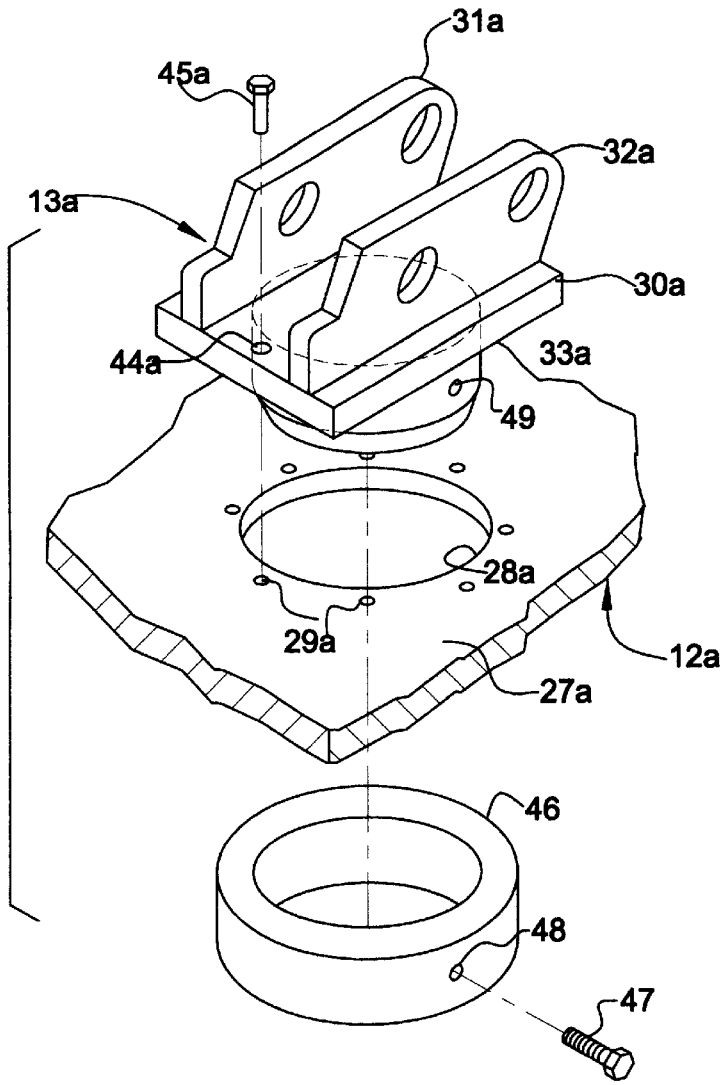
FIG. 5 is a view similar to the view shown in FIG. 3, illustrating a modification of the embodiment shown in FIGS. 1 through 4.
Figure 6:
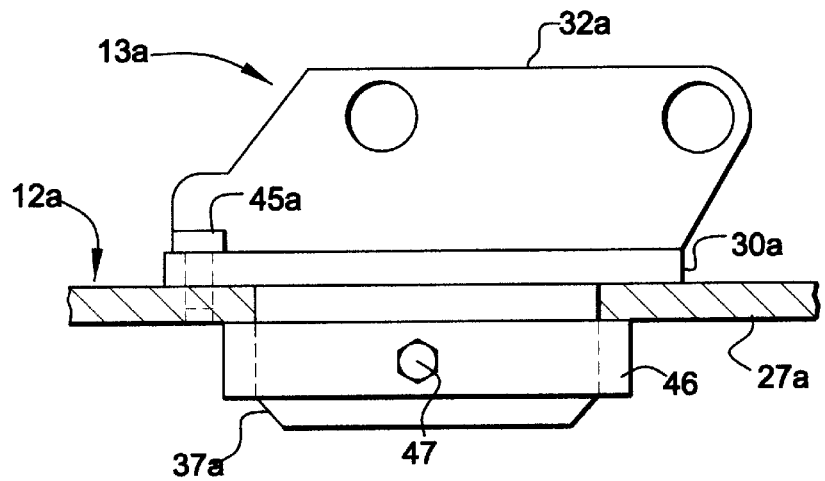
FIG. 6 is a view similar to the view shown in FIG. 4, illustrating the embodiment shown in FIG. 5 in an assembled, operative condition.

FIGS. 5 and 6 illustrate another embodiment of the invention which is similar to the embodiment shown in FIGS. 1 through 4 with the exception of the means for preventing the linear displacement of the coupler member and implement relative to each other. Such means comprises a locking ring 46 adapted to be mounted on the inserted section of the coupler member and secured thereto by means of a threaded bolt 47 either extending through a bolt hole 48 in locking ring 47 and adapted to thread into a registrable hole 49 provided in the inserted section of the coupler member or threaded into a threaded hole in the locking ring and adapted to engage the inserted section of the coupler member. In all other respects, coupler member 13a is comparable in construction and function to coupler member 13, and implement 12a is comparable in construction and function to implement 12, as shown in FIGS. 1 through 4.

In the operative condition as shown in FIG. 6, it will be seen that locking ring 46 is mounted on the inserted section of the coupler member so that the upper annular surface thereof either engages or is slightly spaced from the undersurface of implement wall 27a to restrict the linear displacement of the coupler member and implement relative to each other along a line of travel coinciding with or parallel to the axis of the insertable section of the coupler member. The angular displacement of the coupler member and implement relative to each other about the axis of the insertable section of the coupler member is restricted by locking pin or threaded bolt 45a in the same manner as locking pin or threaded bolt 45 in the embodiment shown in FIGS. 1 through 4.

Figure 7:
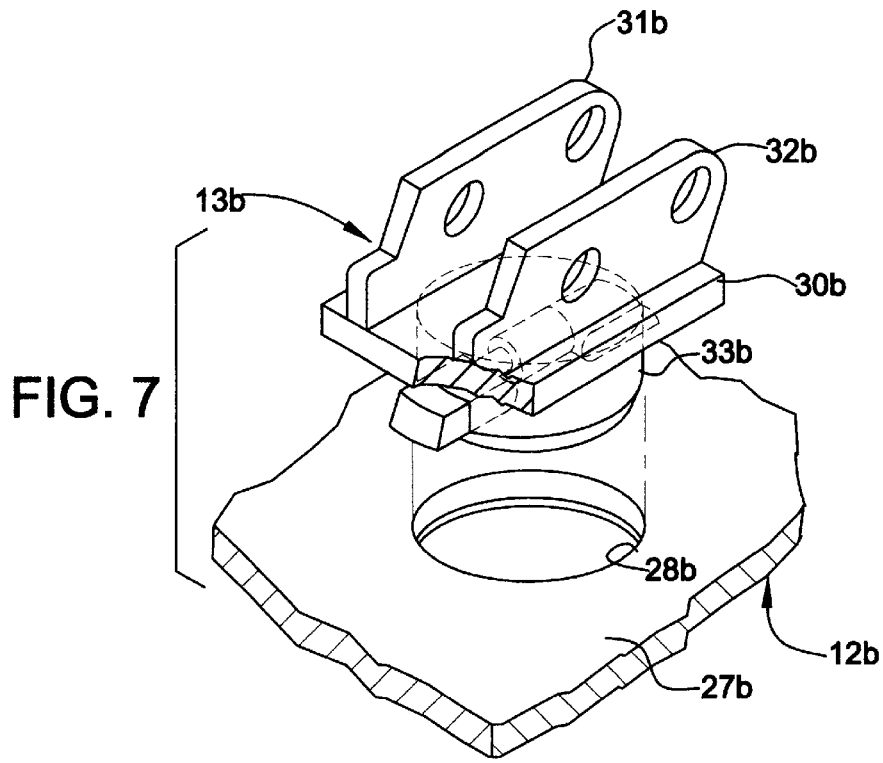
FIG. 7 is a view similar to the view shown in FIG. 5, illustrating another embodiment of the present invention.
Figure 8:
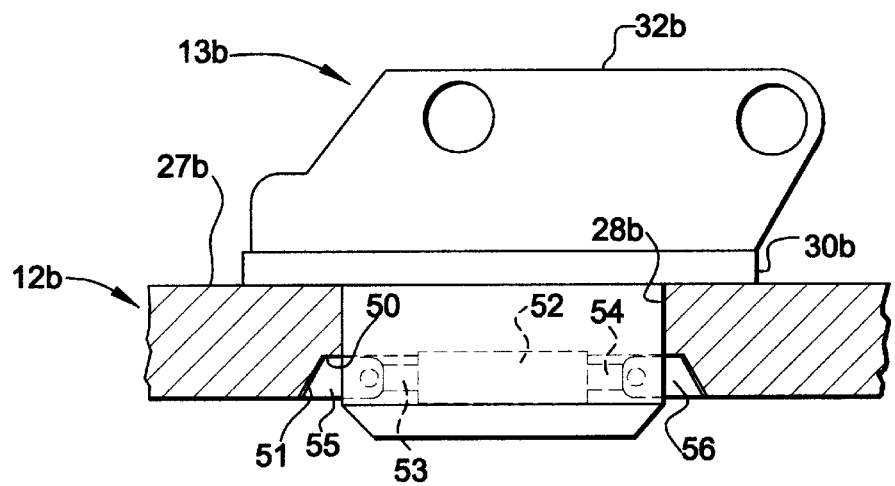
FIG. 8 is a view similar to the view shown in FIG. 6, illustrating the components shown in FIG. 7 in an assembled, operative condition.

FIGS. 7 and 8 illustrate a further embodiment of the invention which is similar to the embodiment shown in FIGS. 1 through 4 with the exception of the means provided for restricting both the angular and linear displacement of the coupler member and implement relative to each other about the axis of the inserted section of the coupler member and along a line of travel coinciding with such axis. Such means consists of a pair of radially extendable gripping members engageable with an annular wall of the implement when the inserted section of the coupler member is in the operative position as shown in FIG. 8.

The coupler member of such embodiment is similar to the previously described coupler members and includes a base plate section 30b, a set of bracket sections 31b and 32b for detachably securing the coupler member to the operating arm of the machine and a depending section 33b adapted to be received within an opening 28b in a wall portion 27b of an implement 12b. As best shown in FIG. 8, a lower end of wall opening 28b is enlarged to provide an upper annular wall 50 and a beveled annular side wall 51. Insertable section 33b of the coupler member is provided with a diametrically disposed, double acting fluid cylinder assembly having a fluid cylinder 52, displaceable rods 53 and 54 and wedge members 55 and 56 engageable in gripping relation with annular beveled surface 51 in the enlarged section of wall opening 28b.

It will be appreciated that by applying fluid under pressure to the ends of cylinder 52 wedge members 55 and 56 will be caused to be retracted to positions within insertable section 33b of the coupler member to permit the insertion and removal of such section with respect to wall opening 28b. With coupler section 33b inserted in wall opening 28b, fluid under pressure may be supplied to a center port of cylinder 52 to extend rods 53 and 54 and cause wedge members 55 and 56 to engage annular beveled surface 51 in wedging relation thus locking implement 12 to coupler 13b, as shown in FIG. 8. The controls for the fluid supply system for cylinder 52 may be located in the operator's cab so that the attachment, detachment and angular repositioning of the implement relative to the coupler member may be controlled from the operator's station on the machine. With the wedge members extended as shown in FIG. 8, it further will be appreciated that the implement will be prevented from angularly displacing relative to the coupler member about the axis of inserted coupler section 33b, and linear displacement of the implement relative to the coupler member along the axis of coupler section 33b is restricted by the engagement of base plate section 30b with the upper surface of the implement wall and the engagement of the wedge members with annular surface 50 of the annular recess provided in wall opening 28b.

In the operation of the embodiment shown in FIGS. 7 and 8, with the implement seated on the ground, the machine positioned near the implement and the coupler member connected to the operating arm with the wedge members retracted, the operating arm of the machine may be maneuvered to insert coupler section 33b into wall opening 28b so that base plate section 30b is seated on the upper surface of the implement wall and the outer faces of the wedging members are disposed in opposed relation to annular beveled wall 51, the operating arm may be maneuvered further to position the coupler member in the desired angular relationship with the implement and appropriate controls at the operator's station may be operated to extend wedge members 55 and 56 into wedging engagement with annular beveled surface 51 to lock the implement to the coupler member in the selected orientation. The assembly would then be in a condition to perform the desired work function. Whenever it was desired to change the angle of the implement relative to the coupler member, the operating arm of the machine may be operated to reposition the implement on the ground, the appropriate controls may be operated to retract wedge members 55 and 56 thus releasing the implement from the coupler, the operating arm may be maneuvered to alter the angular relationship of the implement to the coupler member and then with the implement in the desired position, the appropriate controls may be operated to again extend wedge members 55 and 56 to lock the implement to the coupler in the desired position relative to the coupler member.

The control system for supplying fluid to cylinder 52 may be modified to provide for selectively partially and fully extending and retracting the wedge members. With such a system, when undertaking merely to adjust the angle of the implement relative to the coupler member, wedge members 55 and 56 can be only partially retracted to retract them sufficiently out of gripping relation with annular beveled wall 51 yet insufficiently to retract them beyond annular wall 50 which would result in possible disengagement of the implement from the coupler member. Such ability would permit the reorientation of the coupler relative to the implement without totally disengaging the implement and also the possible inadvertent disengagement of the implement from the coupler member which otherwise might result in damage to property or injury to operating personnel.

Figure 9:
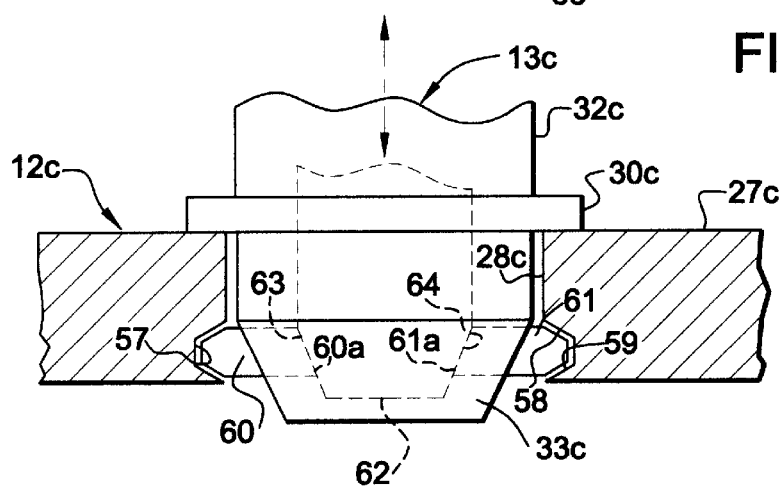
FIG. 9 is a view similar to the view shown in FIG. 8, illustrating a modification of the embodiment shown in FIGS. 7 and 8.

FIG. 9 illustrates a modification of the assembly shown in FIGS. 7 and 8. Such modification is similar to the assembly shown in FIGS. 7 and 8 with the exception of the construction of the wedge members and the means for extending them. The modification includes a coupling member 13c comparable to coupler member 13b, and an implement 12c comparable to implement 12b. The implement is provided with a circular opening 28c which is provided with an annular recess at a lower end thereof having an annular side wall surface 57 and upper and lower annular beveled surfaces 58 and 59. Coupler member 13c is provided with a depending section 33c adapted to be received within implement wall opening 28c, a pair of radially displaceable wedge members 60 and 61 adapted to be extended into and out of the annular recess in opening 28c and a base plate member 30c adapted to engage and seat on the upper surface of implement wall 27c when coupler section 33c is inserted in implement wall opening 28c to properly position wedge members 60 and 61 in alignment with the annular recess in wall opening 28c. The coupler member further is provided with an axially displaceable camming member 62 having converging surfaces 63 and 64 adapted to engage converging surfaces 60a and 61a of wedge members 60 and 61 to cam such wedges radially outwardly when camming member 62 is moved downwardly. Further means are provided for either camming or otherwise moving wedge members 60 and 61 into fully retracted or selectively into fully or partially retracted positions to allow either the insertion or removal of coupler section 33c relative to wall opening 28c or a partial disengagement of the wedge members to permit the reorientation of the coupler member without fully detaching the coupler from the implement. The modification as shown in FIG. 9 may be operated in all other respects similar to the embodiment as shown in FIGS. 7 and 8 to attach the implement to the coupler member, fully detach the implement from the coupler member, reposition the coupler member relative to the implement with the locking members fully retracted and reposition the coupler member relative to the implement with the wedge members partially retracted and without the implement disengaged from the coupler member.

In each of the embodiments and modifications as described, it will be appreciated that there is provided an assembly wherein the coupler may be used with a wide variety of implements having the type of wall opening as described for receiving the insertable portion of the coupler member, the coupler member may be easily maneuvered to attach and detach the implement and the coupler member further may be manipulated to vary the angular relationship of the implement relative to the coupler member about a given axis to provide a more versatile implement to provide for diverse working functions of the implement.

From the foregoing detailed description, it will be evident that there are a number of changes, adaptations and modifications of the present invention which come within the province of those persons having ordinary skill in the art to which the aforementioned invention pertains. However, it is intended that all such variations not departing from the spirit of the invention be considered as within the scope thereof as limited solely by the appended claims.

What is claimed is:

1. An assembly connectable to an operating arm of a machine for performing work functions comprising:

an implement having a wall provided with an opening therein; and a coupler including a main body portion, means for detachably securing said main body portion to said operating arm and means carried on and secured to said main body portion insertable into said wall opening and maneuverable by said operating arm to an operative position having a selected angular relationship with said implement relative to a given axis and means for securing said insertable means in said operative position having said selected angular relationship.

2. An assembly according to claim 1 wherein said second mentioned securing means is detachable.

3. An assembly according to claim 1 wherein said second mentioned securing means includes a first detachable means cooperable with said implement for restricting angular displacement of said implement relative to said means insertable into said wall opening about said axis and a second detachable means cooperable with said implement for restricting linear displacement between said implement and said coupler along a line of travel parallel to said axis.

4. An assembly according to claim 3 wherein said first detachable restricting means comprises a locking pin insertable in an opening in one of said coupler and implement and a selected one of a plurality of registrable openings in the other of said coupler and implement, circumferentially spaced relative to said axis.

5. An assembly according to claim 3 wherein said first detachable restricting means comprises a threaded fastener insertable through an opening in one of said coupler and implement and threadable into a selected one of a plurality of registrable openings in the other of said coupler and said implement, circumferentially spaced relative to said axis.

6. An assembly according to claim 3 wherein said second detachable restricting means includes a member engageable with one side of said implement wall.

7. An assembly according to claim 6 wherein said coupler includes a portion engageable with the other side of said implement wall whereby a portion of said implement wall is interposed between said coupler portion and said member when said insertable means is in the operative position.

8. An assembly according to claim 6 wherein said member has an annular configuration.

9. An assembly according to claim 6 wherein said member comprises a split locking ring.

10. An assembly according to claim 9 wherein said insertable means includes an annular recess and said split locking ring is partially received within said annular recess and partially engages said implement wall when said insertable means is in said operative position.

11. An assembly according to claim 3 wherein said second detachable restricting means comprises at least one member disposed on said insertable means and displaceable between a retracted position out of engagement with a surface of said implement wall and an extended position in locking engagement with said implement wall when said insertable means is in said operative position, and means for selectively displacing said displaceable member between said retracted and extended positions.

12. An assembly according to claim 1 wherein said wall opening is circular and said insertable means is cylindrical.

13. An assembly according to claim 12 wherein said cylindrical insertable means is provided with a beveled end portion to facilitate insertion thereof into said implement wall opening.

14. An assembly according to claim 1 wherein said second mentioned securing means comprises at least one member disposed on said insertable means and displaceable between a retracted position out of engagement with a surface of said implement wall and an extended position in locking engagement with said implement wall surface when said insertable means is in said operative position and means for selectively displacing said displaceable member between said extended and retracted positions.

15. An assembly according to claim 14 wherein said displaceable member is engageable with said implement wall surface in wedging relation.

16. An assembly according to claim 14 wherein said engageable wall surface is annular.

17. An assembly according to claim 16 wherein said annular surface is beveled and said displaceable means is provided with a surface engageable with said beveled annular wall surface which is complementary therewith to permit said surfaces to engage in wedging relation.

18. An assembly according to claim 14 wherein said displacing means comprises fluid actuated means.

19. An assembly according to claim 14 wherein said displacing means comprises camming means.

20. An assembly according to claim 14 wherein said engageable surface of said implement wall is provided in a recessed portion of a side wall of said opening.

21. An assembly according to claim 20 wherein said engageable surface of said implement wall is annular.

22. An assembly according to claim 21 wherein said engageable surface is beveled.

23. An assembly according to claim 14 wherein said wall opening is circular and said insertable member is cylindrical.

24. An assembly according to claim 23 wherein an end portion of said insertable means is beveled to facilitate insertion into said wall opening.

* * * * *